(12) United States Patent
Singh

(10) Patent No.: US 7,306,821 B2
(45) Date of Patent: *Dec. 11, 2007

(54) PROCESS FOR PRODUCING A HIGH SOLUBILITY, LOW VISCOSITY, ISOFLAVONE-ENRICHED SOY PROTEIN ISOLATE AND THE PRODUCTS THEREOF

(75) Inventor: Navpreet Singh, Fort Wayne, IN (US)

(73) Assignee: Solae, LLC, St. Louis, MO (US)

( * ) Notice: Subject to any disclaimer, the term of this patent is extended or adjusted under 35 U.S.C. 154(b) by 282 days.

This patent is subject to a terminal disclaimer.

(21) Appl. No.: 10/406,429

(22) Filed: Apr. 3, 2003

(65) Prior Publication Data

US 2003/0211225 A1    Nov. 13, 2003

Related U.S. Application Data

(60) Provisional application No. 60/369,691, filed on Apr. 3, 2002.

(51) Int. Cl.
*A23L 1/20* (2006.01)

(52) U.S. Cl. .................. 426/656; 426/634; 530/378; 530/396

(58) Field of Classification Search .............. 426/656, 426/634; 530/378, 396
See application file for complete search history.

(56) References Cited

U.S. PATENT DOCUMENTS

| | | | |
|---|---|---|---|
| 3,995,071 | A | 11/1976 | Goodnight, Jr. et al. |
| 4,420,425 | A | 12/1983 | Lawhon ................. 260/123.5 |
| 5,086,166 | A | 2/1992 | Lawhon et al. ............. 530/378 |
| 5,702,752 | A | 12/1997 | Gugger et al. ............. 426/634 |
| 5,792,503 | A | 8/1998 | Gugger et al. ............. 426/634 |
| 5,858,449 | A | 1/1999 | Crank et al. ............... 426/656 |
| 5,936,069 | A | 8/1999 | Johnson .................... 530/378 |
| 5,994,508 | A | 11/1999 | Bryan et al. ............... 530/378 |
| 6,313,273 | B1 | 11/2001 | Thomas et al. |
| 6,818,246 | B2 * | 11/2004 | Singh ....................... 426/656 |
| 7,083,819 | B2 * | 8/2006 | Singh ....................... 426/459 |
| 2002/0098276 | A1 | 7/2002 | Porter et al. .............. 426/629 |
| 2002/0102346 | A1 | 8/2002 | Stark et al. ............... 426/629 |
| 2002/0106437 | A1 | 8/2002 | Karleskind et al. ......... 426/590 |
| 2002/0106440 | A1 | 8/2002 | Porter et al. .............. 426/629 |
| 2002/0114877 | A1 | 8/2002 | Stark et al. ............... 426/656 |
| 2003/0211225 | A1 * | 11/2003 | Singh ....................... 426/634 |

OTHER PUBLICATIONS

Article—Production of Soy Isolates by Ultrafiltration: Factors Affecting Yield and Composition, Nichols et al., vol. 46 (1981) Journal of Food Science, pp. 367-371.

Article—Changes of Isoflavones During Process of Soy Protein Isolates, Wang et al., 1998 JAOCS, vol. 75, No. 3, pp. 337-341.

Article—Factors Affecting Isoflavone Content in Soybean Seeds: Changes in Isoflavones, Saponins, and Composition of Fatty Acids at Different Temperatures during Seed Development, Tsukamoto et al., 1995 American Chemical Society, J. Agric. Food Chemistry, 43, pp. 1184-1192.

* cited by examiner

*Primary Examiner*—Chin-Min Kam
(74) *Attorney, Agent, or Firm*—James L. Cordek; Holly M. Amjad

(57) ABSTRACT

A soy protein isolate that has increased amounts of isoflavones and saponins and a high Nitrogen Solubility Index ("NSI") is produced by a process that involves ultrafiltration and the avoidance of isoelectric precipitation. The soy protein isolate has at least about 90.0 wt. % protein of total dry matter; an isoflavone content of at least about 1.0 mg/g isoflavones of total dry matter; a Nitrogen Solubility Index ("NSI") of at least about 75%; and wherein a solution of about 12.0 wt. % of the soy protein isolate in water at a temperature of about 22° C. has a viscosity of less than about 500 centipoise (cp). The isolate is high in saponins and has at least 2.0 mg/g soyasapogenols. The process for producing the soy protein isolate involves removing fiber from a defatted soybean material and obtaining liquor that is subsequently pasteurized. Next, sugars and other small molecular weight components are removed from the liquor using membrane separation with diafiltration while retaining isoflavones and saponins and the resulting retentate is subjected to pasteurization, and optionally spray dried.

21 Claims, No Drawings

US 7,306,821 B2

PROCESS FOR PRODUCING A HIGH SOLUBILITY, LOW VISCOSITY, ISOFLAVONE-ENRICHED SOY PROTEIN ISOLATE AND THE PRODUCTS THEREOF

CROSS REFERENCE TO RELATED APPLICATIONS

This application claims the benefit under Title 35, U.S.C. § 119(e) of U.S. Provisional Patent Application Ser. No. 60/369,691, entitled PROCESS FOR PRODUCING ISOFLAVONE-ENRICHED SOY PROTEIN ISOLATE AND THE PRODUCT THEREOF, filed on Apr. 3, 2002.

BACKGROUND OF THE INVENTION

1. Field of the Invention

This invention relates to a high solubility, low viscosity, isoflavone enriched vegetable protein isolate and a process for producing the same.

2. Description of the Related Art

The benefits of soy protein are well documented. Cholesterol is a major concern with consumers throughout the industrialized world. It is well known that vegetable products contain no cholesterol. For decades, nutritional studies have indicated that the inclusion of soy protein in the diet actually reduces serum cholesterol levels in people who are at risk. The higher the cholesterol, the more effective soy proteins are in lowering that level.

Soybeans have the highest protein content of all cereals and legumes. In particular, soybeans have about 40.0 wt. % protein, while other legumes have between 20.0 wt. % and 30.0 wt. % protein, and cereals have between about 8.0 wt. % and 15.0 wt. % protein. Soybeans also contain about 20.0 wt. % oil, and the remaining dry matter is mostly carbohydrates (about 35.0 wt. %). In the soybean, both protein and lipid bodies are contained in the usable meat of the soybean, called the cotyledon. The complex carbohydrate (dietary fiber) is also contained in the cell walls of the cotyledon. The outer layer of cells (the seed coat) makes up about 8.0 wt. % of the soybean's total weight. A typical raw soybean includes approximately 18.0 wt. % oil, 15.0 wt. % soluble carbohydrates, 15.0 wt. % insoluble carbohydrates, 14.0 wt. % moisture and ash, and 38.0 wt. % protein.

In processing, soybeans are carefully selected for color and size. The soybeans are then cleaned, conditioned (to make removal of the hull easier) and cracked, dehulled and then rolled into flakes. The flakes are subjected to a solvent bath that removes the oil. The solvent is removed and the flakes are dried, creating the defatted soy flakes that are the basis of all soy protein products. Despite the large number of products on the market, there are only three types of soy protein products: flours, concentrates, and isolates.

Soy flours are the simplest forms of soy protein, having a protein content of approximately 50.0 wt. %. Soy flours are produced by simply grinding and screening the defatted flakes. This simple processing leaves the soy flour with many of the soybean's characteristics. The lack of processing also makes soy flours highly variable in terms of quality.

Soy flours and grits are still widely produced and are used most often in baked goods, snack foods and pet foods applications where the high flavor profile does not pose a problem. Textured soy flours were an early attempt at simulating or enhancing the texture of meat products. Texturizing does not change the composition of soy flours and reduces the flavor profile only slightly. The primary applications of texturized soy flours are inexpensive meat products or pet foods.

Soy concentrates have at least 65.0 wt. % protein. Soy protein concentrates are made by removing soluble carbohydrate material from defatted soy meal. Aqueous alcohol extraction (60-80% ethanol) or acid leaching (at the isoelectric pH 4.5 of the protein) are the most common means for carbohydrate removal. In both aqueous alcohol extraction and acid leaching, however, essentially all of the protein is rendered insoluble. Protein solubility may be recovered in acid leach products by neutralization. A myriad of applications have been developed for soy concentrates and texturized concentrates in processed foods, meat, poultry, fish, cereal and dairy systems.

Isolates are produced through standard chemical isolation, drawing the protein out of the defatted flake through solubilization (alkali extraction at pH 7-10) and separation followed by isoelectric precipitation. As a result, isolates are at least 90.0 wt. % protein on a moisture-free basis. They are sometimes high in sodium and minerals (ash content), a property that can limit their application. Their major applications have been in dairy substitution, as in infant formulas and milk replacers.

Isoflavones occur in a variety of leguminous plants and oilseeds, including vegetable protein materials such as soybeans. These compounds generally include daidzin, 6"-O-acetyldaidzin, 6"-O-malonyldaidzin, daidzein, genistin, 6"-O-acetylgenistin, 6"-O-malonylgenistin, genistein, glycitin, 6"-O-malonylglycitin, glycitein, biochanin A, and formononetin.

It has recently been suggested that the isoflavones contained in vegetable proteins such as soybeans may inhibit the growth of human cancer cells, such as breast cancer cells, prostate cancer cells and colon cancer cells. In addition, it has been suggested that isoflavones reduce cardiovascular risk factors, for example by reducing the levels of atherosclerosis inducing lipoproteins and low-density cholesterol and by increasing endothelial dependent vasodilation response. Isoflavones are also showing promise in preventing osteoporosis and treating menopausal symptoms.

Isoflavone compounds have been associated with an inherent, bitter flavor in vegetable protein materials such as soybeans. In the commercial production of such protein materials, such as protein isolates and protein concentrates, the focus has been to remove isoflavone compounds. For example, in a conventional process for the production of a soy protein isolate, soy flakes are extracted with an aqueous medium having a pH above the isoelectric point of the protein to solubilize the protein. The extract containing the protein is separated from insoluble fiber materials to provide a protein extract. Most of the isoflavones are solubilized in the extract as well as the protein. The protein is precipitated by acid leaching, i.e., adjusting the pH of the extract to about the isoelectric point of the protein, typically between 4.2 and 4.6 for soy protein, with an acid. The precipitated protein is then separated from the extract. Much of the isoflavones remain solubilized in the extract following separation of the precipitated protein (curd) from the extract; however, some of the isoflavones are usually present in the precipitated curd. After separation of the precipitated protein curd from the extract, the extract and the isoflavones solubilized therein are usually discarded. Any residual isoflavones left in the separated protein are removed by exhaustive washing of the protein to ensure that the taste associated with the isoflavones is not present in the protein. Therefore, these commercial isolates contain essentially no isoflavones.

It is desirable, however, to provide an isoflavone rich protein material, and a process for producing the same, which is suitable for administration in a diet. Such an isoflavone rich protein material can be used to provide the nutritional benefits of the protein and the health benefits of the isoflavones when administered in a diet.

It is known to produce a protein material which includes isoflavones by a process that involves subjecting a vegetable material containing protein and isoflavones to extraction with an aqueous extractant having a pH above the isoelectric point of the protein material to obtain an extract that contains isoflavones and protein. The pH of the extract is adjusted to about the isoelectric point of the protein material to precipitate a protein curd containing isoflavones. The protein curd is separated from the extract at a temperature of about 20° C. to about 32° C., and optionally washed with only a controlled amount of water, such that many of the isoflavones which are in the precipitated protein curd remain in the resulting isolate. However, because most of the isoflavones remain in the extract when the protein is precipitated at the isoelectric point of the protein, and are subsequently discarded along with the extract, the isoflavone content of these isolates is low, typically below about 0.75 mg/g of total dry matter.

Further, processes that involve the use of isoelectric precipitation, such as those discussed above, reduce the water solubility of the proteins, which is measured by the nitrogen solubility index ("NSI") of the product. In particular, isolates which are produced by processes which involve the use of isoelectric precipitation have an NSI of below about 70%. Isoelectric precipitation and subsequent neutralization also adds minerals to the product, which increases the ash content.

Water solubility of isolates produced using isoelectric precipitation may be increased with heat treatment of the neutralized protein isolate suspension; however, such heat treatment also increases the viscosity of the finished product such that, an increase in the NSI of such products to above 70% by heat treatment also provides a product having a high viscosity, for example, of at least 2,000 centipoise (cp) when reconstituted in water at a 12.0 wt. % solution at a temperature of about 22° C.

Soybeans contain about 0.5 wt. % saponins. Soy saponins have been the subject of investigation since the early 20$^{th}$ century. These compounds consist of a triterpenoid skeleton with various sugar and acetyl moieties. The current consensus is that soyasapogenols A, B and E are true aglycons, while other soyasapogenols are artifacts of hydrolysis conditions. The corresponding glycosides are the so-called "group A saponins", "group B saponins", and "group E saponins", respectively.

Soy saponins have demonstrated anti-mutagenic properties that make them promising agents for cancer prophylaxis. Moreover, group B soy saponins have exhibited pronounced suppressive effects on the replication in vitro of the human immunodeficiency virus (HIV). The chemical structure of soybean saponins is very similar to that of the compound glycyrrhizin, a known anti-viral agent, so soy saponins show promise as building blocks for the synthesis of anti-viral pharmaceutical compounds.

Despite the cultivation and processing of very large quantities of soybeans, at the present time soy saponins are not a significant article of commerce due to the difficulty of isolating and purifying them.

Bowman-Birk Inhibitor Concentrate ("BBIC") has been shown to exhibit inhibitory activity against the malignant transformation of cells under certain conditions and its administration has been shown to affect various forms of cancer.

In particular, it has been shown that the enzyme-inhibitor described by Bowman (*Proc. Soc. Expd. Med.*, 63:547 (1946)) and Birk et al. (*Bull. Res. Council Israel*, Sec. A 11:48 (1962) and *Biochim. Biophys Acta*, 67:326 (1963)), which is found in soybeans and is subsequently referred to as the Bowman-Birk Inhibitor ("BBI"), can prevent, or greatly reduce, radiologically or chemically induced malignant transformation of cells in culture and in experimental animals.

The present invention provides and produces a soy protein isolate that has a high nitrogen solubility index, and a lower viscosity, higher isoflavones content, and higher saponins content than the conventionally available soy protein isolates.

SUMMARY OF THE INVENTION

The present invention provides a soy protein isolate having desirable flavor and functional properties. The soy protein isolate is also high in isoflavones, which are generally absent or present only at very low levels in isolates which are produced by processes that involve isoelectric precipitation of protein. Further, the soy protein isolate is also rich in saponins, has a high Chymotrypsin Inhibitor ("CI") content, has a high NSI, and a low viscosity when reconstituted in water. The process for producing the soy protein isolate uses ultrafiltration and avoids isoelectric precipitation.

In one embodiment, a soy protein isolate is provided having at least 90.0 wt. % protein content, about 1.0 mg/g or more of isoflavones and about 2.0 mg/g or more of soyasapogenols of total dry matter, less than about 6.0 wt. % ash content, and a nitrogen solubility index of at least about 75%.

A process for producing the soy protein isolate is provided, including the steps of providing a soybean material having at least 45.0 wt. % protein (N×6.25), between about 30.0 wt. % and 40.0 wt. % carbohydrates, between about 5.0 wt. % and about 10.0 wt. % moisture, less than about 1.0 wt. % fat and a protein dispersibility index ("PDI") of about 90%. The soybean material is slurried with water at solids content of between about 5.0 wt. % and about 15.0 wt. %, and the pH of the slurry is adjusted to between about 6.8 and about 10.0. The pH-adjusted slurry is then subjected to a centrifuging process to form a liquor that is subsequently pasteurized. Sugars and other small molecular weight components are removed from the liquor using a membrane separation process, such as ultrafiltration. The resulting retentate from the membrane separation process is subjected to pasteurization, and then optionally spray dried.

A novel soy protein isolate is provided having an enriched isoflavone profile. The soy protein isolate is produced from naturally occurring soybeans which are conventionally grown by farmers and used by soybean processors. These soybeans are not genetically modified or otherwise specially developed to have certain characteristics, such as a low content of non-digestible oligosaccharides, for example, raffinose and stachyose. The enriched isoflavone soy protein isolate has highly soluble proteins as indicated by a high nitrogen solubility index. The present soy protein isolate also has a high content of both isoflavones and saponins. The present soy protein isolate also has a low viscosity.

The production process is economically efficient, and may be controlled to achieve a desired soy protein isolate, which includes an enriched isoflavones and saponins content. In particular, it was discovered that by avoiding isoelectric precipitation and using ultrafiltration, saponins and isoflavones can be retained in the product.

In one form thereof, the present invention provides a soy protein isolate, including a protein content of at least about 90.0 wt. % of total dry matter; an isoflavone content of at least about 1.0 mg/g isoflavones of total dry matter; a Nitrogen Solubility Index ("NSI") of at least about 75%; and wherein a solution of about 12.0 wt. % of the soy protein isolate in water at a temperature of about 22° C. has a viscosity of less than about 500 centipoise (cp).

In a further form thereof, the present invention provides a method for producing a soy protein isolate, including the steps of: (a) providing a substantially defatted soybean material; (b) mixing the material with water and extracting proteins from the material; (c) removing insolubles to produce a liquor; (d) heat treating the liquor at a temperature above about 93° C.; and (e) subjecting the liquor to ultrafiltration with diafiltration to obtain a retentate.

DETAILED DESCRIPTION

A soy protein isolate is provided having at least 90.0 wt. % protein; at least about 1.0 mg/g isoflavones and preferably 1.5 mg/g isoflavones or more of total dry matter; less that about 6.0 wt. % ash and preferably less than about 5.5 wt. % ash; and less than about 2.0 wt. % crude fiber of total dry matter. The isolate also has a nitrogen solubility index ("NSI") of at least 75%, and preferably about 80% or above. The isolate is high in saponins and comprises at least about 2.0 mg/g soyasapogenols and preferably 2.5 mg/g soyasapogenols or more of total dry matter. The soy protein isolate may further include a Chymotrypsin Inhibitor ("CI") content of at least about 100 mg/g of total dry matter. The soy protein isolate has a viscosity of less than 500 centipoise (cp) when reconstituted in water in a 12.0 wt. % solution at a temperature of about 22° C.

A method for manufacturing a soy protein isolate is provided, including the steps of providing a substantially defatted soybean material; removing fiber from the material; reducing the amount of carbohydrates and minerals by ultrafiltration while retaining isoflavones and saponins; and pasteurizing the retentate.

Generally, the present method encompasses: 1) dehulling whole soybeans; 2) flaking the dehulled soybeans; 3) extracting soybean oil from the flaked soybeans with a solvent such as hexane; 4) desolventizing the defatted soybean flakes without high heating or toasting to produce high PDI white flakes and optionally grinding the white flakes to produce soy flour; 5) removing fiber from the soy flour or flakes; 6) ultrafiltering the liquor (fiber-removed slurry) to remove carbohydrates and minerals while retaining isoflavones and saponins; 7) pasteurizing the liquor; and 8) optionally drying the pasteurized liquor.

Steps 1 through 4 described above are commonly referred to as the extraction process for soybeans. The general procedure for the above-described steps 1 through 4 is well understood, as described in U.S. Pat. No. 5,097,017 to Konwinski, assigned to the assignee of the present invention, the disclosure of which is expressly incorporated herein by reference.

The first item described above is dehulling. Dehulling is the process in which the soybean hulls are removed from the whole soybeans. The soybeans are carefully cleaned prior to dehulling to remove foreign matter, so that product will not be contaminated by color bodies. Soybeans also are normally cracked into about 6 to 8 pieces prior to dehulling.

The hull typically accounts for about 8.0 wt. % of the weight of the whole soybean. The dehulled soybean is about 10.0 wt. % water, 40.0 wt. % protein, 20.0 wt. % fat, with the remainder mainly being carbohydrates, fiber and minerals.

The second step described above is the flaking process. Soybeans are conditioned prior to flaking by adjusting moisture and temperature to make the soybean pieces sufficiently plastic. The conditioned soybean pieces are passed through flaking rolls to form flakes about 0.01 to 0.012 inches (in.) thick.

The third step described above is soybean oil removal from the flakes. The soybean flakes are defatted by contacting them with a solvent, such as hexane, to remove the soybean oil. The soybean oil is used in many applications, such as margarine, shortening and other food products, and is a good source of lecithin, which has many useful applications as an emulsifier.

In the fourth step described above, the hexane-defatted soybean flakes are desolventized to remove the solvent, without toasting, to produce white flakes. The white flakes may be ground to make soy flour. Soy flour that can be used as a starting material for the subject invention is readily, commercially available. Commercial soy flour typically has at least 50.0 wt. % (52.5 wt. %) protein (N×6.25); about 30.0 to 40.0 wt. % (34.6 wt. %) carbohydrates; about 5.0 to 10.0 wt. % (6.0 wt. %) moisture; about 5.0 to 10.0 wt. % (6.0 wt. %) ash; about 2.0 to 3.0 wt. % (2.5 wt. %) crude fiber and less than about 1.0 wt. % (0.9 wt. %) fat (as determined by ether extraction).

The soy flour may have a protein dispersibility index ("PDI") of 90%. PDI is determined by American Oil Chemist's Society (AOCS) method Ba 10-65. Soy flour having 90% PDI would be soy flour with no heat treatment and is enzyme active. The soy flour may be 80-mesh, which means that more than 95 wt. % of the soy flour passes through a number 80 mesh USA standard sieve. According to one embodiment of the present invention, the starting material which can be soy flour or soy flakes is produced according to a separate process, as described in steps 1-4 above. Then, a soy protein isolate is produced according to the steps discussed below. Soy flour or soy flakes with protein dispersibility index ("PDI") of greater than 90% are commercially available from several companies.

The next step involves removing fiber from the material. This is accomplished by slurrying the starting material with water and subjecting the slurry to a separation or clarification process such as centrifugation. The water used to slurry the material may be pre-heated to a temperature of from about 27° C. to about 66° C., and the slurry may have a solids content of between about 5.0 wt. % and about 15.0 wt. %. Agitation or mixing is typically used to slurry the starting material. One means for performing the mixing is a propeller-type agitator.

One means for removing fiber is adjusting the pH of the slurry to between about 6.8 and about 10.0 with alkali, such as sodium hydroxide, and then separating the slurry to form a cake and liquor. The separation can be performed by a number of physical separation means; however, centrifugation is the most efficient and effective means. A scroll-type centrifuge may be used to perform the separation, or the separation can be performed with a disc-type or tubular centrifuge. Although sodium hydroxide is used in the examples herein, other alkaline reagents may be employed such as potassium hydroxide, and calcium hydroxide.

Then, the fiber-removed material may be heat treated, such as by pasteurization at a temperature of about 80° C. or higher, preferably about 93° C. or higher. Pasteurization may be carried out by jet cooking or by holding in a steam-jacketed kettle, for example. Alternatively, this heat treatment step may be conducted prior to the foregoing fiber removal step.

After heat treatment, the pH of the material may optionally be adjusted with a suitable acid to reduce the pH of the material to between about 6.5 and about 7.5. Typically, this pH reduction is performed when the initial water extraction is carried out at a pH toward the upper end of the above-cited range of between about 6.8 and about 10.0. It has been found that adjusting the pH of the material to between about 6.5 and about 7.5 after heat treatment provides a soy protein isolate which, when reconstituted in water at a 10.0 wt. % suspension, has a pH of between about 6.5 and about 8.0.

In the next step, the fiber-removed material (the liquor) is ultrafiltered using a 5,000 to 60,000 molecular weight cut-off ("MWCO") membrane, preferably a 5,000-30,000 MWCO membrane, to achieve a protein content of at least about 90.0 wt. % of total dry matter in the final isolate. The ultrafiltration membrane concentrates the protein content of the liquor in the retentate by permeating carbohydrates and minerals in permeate while retaining isoflavones and saponins in retentate. Isoflavones and saponins are small molecular weight components, typically having a molecular weight of less than 1500. Surprisingly, however, it has been found that isoflavones and saponins are retained by the ultrafiltration membranes in the retentate. It is believed at this time that the isoflavones and saponins might complex with the proteins such that the isoflavones and saponins are retained in the retentate and not permeated along with the carbohydrates and minerals.

Typically, the ultrafiltration is conducted at a temperature of between about 25° C. and about 60° C., preferably between about 25° C. and about 50° C. It is thought that isoflavones and saponins are less soluble in water and complex with proteins to a greater extent at lower temperatures, and conversely, are more soluble in water and complex with proteins to a lesser extent at higher temperatures. Thus, a greater amount of isoflavones and saponins will be retained in the retentate when the ultrafiltration is performed toward the lower end of the above range of between 25° C. and 60° C., and a lesser amount of isoflavones and saponins will be retained in the retentate when the ultrafiltration is performed toward the upper end of the above range of between 25° C. and 60° C.

Suitable membranes of different molecular weight cut-offs are readily and commercially available from several vendors, such as Koch Membrane Systems of Wilmington, Mass.; Osmonics of Minnetonka, Minn.; PTI Advanced Filtration of Oxnard, Calif.; and Synder Filtration of Vacaville, Calif.

Also, the protein content of the retentate may be controlled based upon the amount of permeate removed from the product by ultrafiltration—the more permeate removed, the higher the protein content; the less permeate removed, the lower the protein content. In order to achieve a retentate with at least 90.0 wt % protein content, diafiltration is performed in the present method. Diafiltration refers to the process of adding water to the retentate and continuing the removal of membrane-permeating species in the permeate. Diafiltration can be conducted under either of two modes in the present method: discontinuous or continuous diafiltration. Discontinuous diafiltration is an operation wherein permeable solutes are removed in permeate from the retentate by volume reduction, followed by redilution and re-ultrafiltration in repetitive steps. Continuous diafiltration involves adding water to the feed tank at the same rate at which permeate is being removed by the membranes.

In the next step, the fiber-removed and ultrafiltered material (retentate) may be pasteurized again at a temperature of about 80° C. or higher. Pasteurization may be carried out by jet cooking or by holding in a steam-jacketed kettle.

In the last step, which is optional, the isolate is dried. Drying may be carried out with a vertical spray dryer having a high-pressure nozzle, for example.

The fiber-removed and ultrafiltered material (retentate) may optionally be concentrated after the separation. The concentration may be performed by a reverse osmosis membrane concentration or by evaporation unit operations. A benefit of concentrating the liquor prior to drying is that drying costs are reduced.

The dried isolate may be coated with commercial lecithin or other food-grade surfactants, such as mono-diglycerides, to improve water dispersibility and reduce clumping of the isolate. Such a coating addition could be in the range of about 0.5 wt. % to about 1.0 wt. %, for example.

The isolate has many uses. For example, it can be used as a milk replacer and in drink mixes and beverages, such as chocolate, vanilla and pineapple beverages; dairy products, such as fruit yogurt; nutrition and health products, such as protein bars; whole muscle meat injection; surimi products; emulsified meats; cereal products, such as breakfast cereals; bakery products, such as blueberry muffins and other liquid or dry beverage, food or nutritional products.

In the Examples below, Nitrogen Solubility Index ("NSI") was measured according to American Oil Chemists' Method Ba 11-65. NSI characterizes the amount of protein in the product which is water-soluble, for example, a protein product having an NSI of 75% means that 75 wt. % of the protein therein is water-soluble.

Also, in the Examples below, isoflavones were characterized by the procedure described in Thiagarajan, D. G., Bennink, M. R., Bourquin, L. D., and Kavas, F. A., *Prevention of precancerous colonic lesions in rats by soyflakes, soyflour, genistein, and calcium*, Am. J. Clin. Nutr. 1998; 68(suppl.); 1394S-9S.

The amount of Bowman-Birk Inhibitor ("BBI") in the isolate was characterized by the presence of Chymotrypsin Inhibitor ("CI"), which is an indirect assay for BBI. The method used for CI analysis is based on the American Oil Chemists' Society (AOCS) official method Ba12-75 for trypsin inhibitor activity for soy products, differing in the enzyme and substrate used. The substrate used for CI analysis is N-Glutaryl-L-phenylalanine p-nitroanilide (GPNA), available from Sigma-Aldrich as product number 49738. The enzyme used is α-Chymotrypsin from bovine pancreas (Enzyme Commission (EC) Number: 3.4.21.1), available from Sigma-Aldrich as product number C4129. The AOCS method is based upon Kakade et al. (*Cereal Chemistry*, 51. 376 (1974)). Chymotrypsin hydrolyzes the substrate N-Glutaryl-L-phenylalanine-p-nitroanilide present in excess. The release of p-nitroanilide, a yellow dye, is measured spectrophotometrically. In the presence of soy protein product, the release of p-nitroanilide changes inversely with the level of active chymotrypsin inhibitor.

Saponins were analyzed using High Performance Liquid Chromatography ("HPLC"). An HPLC-based analytical method was developed and validated to estimate saponin precursors present in soybean. The method is based on isolation of total saponins from finely ground soybean or soybean products using an ethanolic extraction followed by acid hydrolysis to cleave the conjugated sugar chain(s) to form their aglucones (soyasapogenols). Resulting soyasapogenols were isolated and concentrated by solid phase extraction techniques. Soyasapogenols were resolved using a reverse phase column with isocratic elusions and detected using an Evaporative Light Scattering Detector ("ELSD"). The quantification of soyasapogenols was performed using the calibration curves derived against authentic compounds. The total soya saponins content is approximately twice the total soyasapogenol content (Duhan et al. (2001) *Int. J. Food Sci. Nutr.* 52:53-59).

The method for measuring solubility index is described in *Standard for Grades of Dry Milks including Methods of Analysis*, Bulletin 916, American Dairy Products Institute, Chicago, Ill. 60606.

Viscosity of the product was measured using a viscometer. 220 grams of high purity water at approximately 22.2° C. (72±2° F.) was added into the 1.2 L (40 oz.) glass blender jar of a Waring 7-speed commercial blender (Model: 34BL97, Waring Commercial, Torrington, Conn. 06790). 15 drops of antifoam (KFO1204A, Lubrizol Corporation, Wickliffe, Ohio 44092) were added to the water. The blender was turned on at speed 1 (low). 30 grams of protein product were added as a steady stream into the vortex of the water. After adding the entire protein product, the blender was run for 15 seconds. After 15 seconds of mixing (blender off), the sides of the blender and blades were scraped with a spatula to resuspend non-blended material. The suspension was mixed again by turning the blender on at speed 1 (low) for 1 minute. A 150-ml beaker was filled with the mixed protein suspension to about ½ inch from the top. The viscosity was determined using a Brookfield Viscometer (Model: RVD-VEA115, Brookfield Engineering Laboratories, Inc., Middleboro, Mass. 02346) using the appropriate spindle. The motor of the viscometer was turned on with the speed set to 100 rpm and the reading recorded at 15 seconds. Two readings were taken in this manner, and the average of two readings was used to calculate viscosity in centipoise (cp) from the conversion chart. Spindle number 2 was used if the viscosity was in the range of 50-200 cp and spindle number 3 was used if the viscosity was in the range of 200-600 cp.

These and other aspects of the present invention may be more readily understood by reference to one or more of the following examples. Unless otherwise indicated herein, all percentages express a given content on a "by weight" basis.

EXAMPLE 1

261.7 kg. (577 pounds (lbs.)) of water were added to a mixing tank at 63.0° C. 22.7 kg. (50 lbs.) of soy white flakes were added. 700 ml of 4.5% NaOH was added to increase the pH to about 7.2. This batch was added to a centrifuge feed tank. A second batch made according to the same procedure was also added to the centrifuge feed tank. The pH of the slurry of the two combined batches was 7.12. The slurry was mixed for 30 minutes at 60.0° C. and thereafter fed at a rate of 7.6 L per minute (two gallons per minute, GPM) to a Sharples scroll-type centrifuge. The liquor from the centrifuge was jet cooked at 121.0° C. The jet-cooked liquor was transferred to a membrane feed tank and a water equivalent to the volume of liquor was added to the tank. The diluted liquor was fed to an ultrafiltration membrane system having a 10,000 MWCO spiral-wound membrane. The temperature of the liquor varied from 29.0° C. to 50.0° C. during membrane processing. All the water added and 75% of the original feed volume were removed as permeate. The retentate from the membrane system was pasteurized at 93.0° C. and spray dried using a high-pressure pump feeding a spray nozzle. The dried product was analyzed to determine the content thereof. The results of the analysis are shown in TABLE 1. All results are on moisture-free basis, unless otherwise stated.

TABLE 1

Composition of product derived from the method of EXAMPLE 1

| Composition | mg/g of total dry matter |
|---|---|
| Protein (wt. %) | 90.00 |
| Crude Fiber (wt. %) | 1.34 |
| Crude Fat (wt. %) | 0.01 |
| Ash (wt. %) | 2.91 |
| Isoflavones | 2.73 |
| Daidzin | 0.43 |
| Glycitin | 0.08 |
| Genistin | 0.69 |
| 6"-O-malonyldaidzin | 0.49 |
| 6"-O-malonylglycitin | 0.08 |
| 6"-O-acetyl genistin | 0.09 |
| 6"-O-malonylgenistin | 0.80 |
| Daidzein | 0.03 |
| Genistein | 0.04 |
| Soyasapogenols | 4.45 |
| soyasapogenol A | 1.24 |
| soyasapogenol B | 3.21 |
| Nitrogen Solubility Index (NSI) (%) | 90.9 |
| Solubility Index (ml of sediment) | 2.0 |

EXAMPLE 2

About 227.1 L (60 gallons) of water were added to a mixing tank and heated to 60° C. (140° F.). Then, about 45.4 kg (100 pounds) of soy flour were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 7.02. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The suspension was fed to an ultrafiltration membrane system containing two spiral-wound membranes, both of 30,000 MWCO. The temperature of the suspension was maintained at about 48.9° C. (120° F.) during membrane processing. After removing about 189.3 L (50 gallons) of permeate, 189.3 L (50 gallons) of water was added to the membrane feed tank. This step of permeate removal and water addition (diafiltration) was repeated twice again so that total volume of water added to membrane feed tank was 567.8 L (150 gallons). All the water added to membrane feed tank and about 75% of the original feed volume added to the membrane feed tank was removed as permeate so that the total volume of permeate removed was 851.7 L (225 gallons). The retentate from the membrane system was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 2. All results are on moisture-free basis, unless otherwise stated.

TABLE 2

Composition of product derived from the method of EXAMPLE 2

| Composition | mg/g of total dry matter |
|---|---|
| Protein (wt. %) | 91.59 |
| Crude Fiber (wt. %) | 1.06 |
| Crude Fat (wt. %) | 0.01 |
| Ash (wt. %) | 4.99 |
| Fructose | 0 |
| Glucose/Galactose | 0 |
| Sucrose | 7.23 |
| Raffinose | 2.45 |
| Stachyose | 7.87 |
| Isoflavones | 1.31 |
| Daidzin | 0.34 |
| Glycitin | 0.04 |
| Genistin | 0.34 |
| 6"-O-malonyldaidzin | 0.18 |
| 6"-O-malonylglycitin | 0.03 |
| 6"-O-acetyl genistin | 0.06 |
| 6"-O-malonylgenistin | 0.26 |
| Daidzein | 0.02 |
| Genistein | 0.04 |
| Soyasapogenols | 3.89 |
| soyasapogenol A | 0.87 |
| soyasapogenol B | 3.02 |
| Nitrogen Solubility Index (NSI) (%) | 86.2 |
| Solubility Index (ml of sediment) | 4.0 |
| Viscosity (cP) | 167.6 |
| Chymotrypsin Inhibitor (CI) | 192.04 |

EXAMPLE 3

About 227.1 L (60 gallons) of water were added to a mixing tank and heated to 60° C. (140° F.). Then, about 45.4 kg (100 pounds) of soy flour were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 6.84. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The pH of the suspension was adjusted to 6.75 using citric acid. The suspension was fed to an ultrafiltration membrane system containing two spiral-wound membranes, both of 30,000 MWCO. The temperature of the suspension was maintained at about 48.9° C. (120° F.) during membrane processing. After removing about 189.3 L (50 gallons) of permeate, 189.3 L (50 gallons) of water was added to the membrane feed tank. This step of permeate removal and water addition (diafiltration) was repeated twice again so that total volume of water added to membrane feed tank was 567.8 L (150 gallons). All the water added to membrane feed tank and about 75% of the original feed volume added to the membrane feed tank was removed as permeate so that the total volume of permeate removed was 851.7 L (225 gallons). The retentate from the membrane system was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 3. All results are on moisture-free basis, unless otherwise stated.

TABLE 3

Composition of product derived from the method of EXAMPLE 3

| Composition | mg/g of total dry matter |
|---|---|
| Protein (wt. %) | 91.06 |
| Crude Fiber (wt. %) | 1.15 |
| Crude Fat (wt. %) | 0.05 |
| Ash (wt. %) | 4.86 |
| Fructose | 0 |
| Glucose/Galactose | 0 |
| Sucrose | 5.44 |
| Raffinose | 2.41 |
| Stachyose | 10.57 |
| Isoflavones | 1.38 |
| Daidzin | 0.25 |
| Glycitin | 0.03 |
| Genistin | 0.36 |
| 6"-O-malonyldaidzin | 0.24 |
| 6"-O-malonylglycitin | 0.03 |
| 6"-O-acetyl genistin | 0.08 |
| 6"-O-malonylgenistin | 0.33 |
| Daidzein | 0.02 |
| Genistein | 0.04 |
| Soyasapogenols | 3.88 |
| soyasapogenol A | 0.83 |
| soyasapogenol B | 3.05 |
| Nitrogen Solubility Index (NSI) (%) | 86.4 |
| Solubility Index (ml of sediment) | 3.5 |
| Viscosity (cP) | 62.4 |
| Chymotrypsin Inhibitor (CI) | 204.47 |

EXAMPLE 4

About 227.1 L (60 gallons) of water were added to a mixing tank and heated to 60° C. (140° F.). Then, about 45.4 kg (100 pounds) of soy flour were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The pH of the suspension was adjusted to about 7.00 using citric acid. The suspension was fed to an ultrafiltration membrane system containing two spiral-wound membranes, both of 30,000 MWCO. The temperature of the suspension was maintained at about 48.9° C. (120° F.) during membrane processing. After removing about 189.3 L (50 gallons) of permeate, 189.3 L (50 gallons) of water was added to the membrane feed tank. This step of permeate removal and water addition (diafiltration) was repeated twice again so that total volume of water added to membrane feed tank was 567.8 L (150 gallons). All the water added to membrane feed tank and about 75% of the original feed volume added to the membrane feed tank was removed as permeate so that the total volume of permeate removed was 851.7 L (225 gallons). The retentate from the membrane system was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 4. All results are on moisture-free basis, unless otherwise stated.

TABLE 4

Composition of product derived from the method of EXAMPLE 4

| Composition | mg/g of total dry matter |
|---|---|
| Protein (wt. %) | 91.03 |
| Crude Fiber (wt. %) | 1.16 |
| Crude Fat (wt. %) | 0.04 |
| Ash (wt. %) | 4.96 |
| Fructose | 0 |
| Glucose/Galactose | 0 |
| Sucrose | 4.84 |
| Raffinose | 2.52 |
| Stachyose | 10.73 |
| Isoflavones | 1.37 |
| Daidzin | 0.28 |
| Glycitin | 0.04 |
| Genistin | 0.40 |
| 6"-O-malonyldaidzin | 0.22 |
| 6"-O-malonylglycitin | 0.03 |
| 6"-O-acetyl genistin | 0.07 |
| 6"-O-malonylgenistin | 0.28 |
| Daidzein | 0.02 |
| Genistein | 0.03 |
| Soyasapogenols | 3.43 |
| soyasapogenol A | 0.79 |
| soyasapogenol B | 2.64 |
| Nitrogen Solubility Index (NSI) (%) | 86.6 |
| Solubility Index (ml of sediment) | 5.0 |
| Viscosity (cP) | 80.9 |
| Chymotrypsin Inhibitor (CI) | 191.08 |

TABLE 5

Composition of product derived from the method of EXAMPLE 5

| Composition | mg/g of total dry matter |
|---|---|
| Protein (wt. %) | 92.12 |
| Crude Fiber (wt. %) | 0.84 |
| Crude Fat (wt. %) | 0.01 |
| Ash (wt. %) | 4.40 |
| Fructose | 0 |
| Glucose/Galactose | 0 |
| Sucrose | 0 |
| Raffinose | 1.68 |
| Stachyose | 6.51 |
| Isoflavones | 1.22 |
| Daidzin | 0.24 |
| Glycitin | 0.04 |
| Genistin | 0.37 |
| 6"-O-malonyldaidzin | 0.18 |
| 6"-O-malonylglycitin | 0.02 |
| 6"-O-acetyl genistin | 0.07 |
| 6"-O-malonylgenistin | 0.23 |
| Daidzein | 0.03 |
| Genistein | 0.04 |
| Soyasapogenols | 2.82 |
| soyasapogenol A | 0.65 |
| soyasapogenol B | 2.17 |
| Nitrogen Solubility Index (NSI) (%) | 84.0 |
| Solubility Index (ml of sediment) | 6.5 |
| Viscosity (cP) | 176.0 |
| Chymotrypsin Inhibitor (CI) | 201.54 |

EXAMPLE 5

About 227.1 L (60 gallons) of water were added to a mixing tank and heated to 60° C. (140° F.). Then, about 45.4 kg (100 pounds) of soy flour were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 6.91. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The pH of the suspension was adjusted to 6.75 using hydrochloric acid. The suspension was fed to an ultrafiltration membrane system containing two spiral-wound membranes, both of 30,000 MWCO. The temperature of the suspension was maintained at about 48.9° C. (120° F.) during membrane processing. After removing about 189.3 L (50 gallons) of permeate, 189.3 L (50 gallons) of water was added to the membrane feed tank. This step of permeate removal and water addition (diafiltration) was repeated twice again so that total volume of water added to membrane feed tank was 567.8 L (150 gallons). All the water added to membrane feed tank and about 75% of the original feed volume added to the membrane feed tank was removed as permeate so that the total volume of permeate removed was 851.7 L (225 gallons). The retentate from the membrane system was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 5. All results are on moisture-free basis, unless otherwise stated.

EXAMPLE 6

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 6.97. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The suspension was fed to an ultrafiltration membrane system containing two spiral-wound membranes, one each of 50,000 and 60,000 MWCO. The temperature of the suspension was maintained at about 48.9° C. (120° F.) during membrane processing. After removing about 189.3 L (50 gallons) of permeate, 189.3 L (50 gallons) of water was added to the membrane feed tank. This step of permeate removal and water addition (diafiltration) was repeated twice again so that total volume of water added to membrane feed tank was 567.8 L (150 gallons). All the water added to membrane feed tank and about 75% of the original feed volume added to the membrane feed tank was removed as permeate so that the total volume of permeate removed was 851.7 L (225 gallons). The retentate from the membrane system was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 6. All results are on moisture-free basis, unless otherwise stated.

TABLE 6

Composition of product derived from the method of EXAMPLE 6

| Composition | mg/g of total dry matter |
|---|---|
| Protein (wt. %) | 92.43 |
| Crude Fiber (wt. %) | 0.53 |
| Crude Fat (wt. %) | 0.22 |
| Ash (wt. %) | 5.16 |
| Fructose | 0 |
| Glucose/Galactose | 0 |
| Sucrose | 0 |
| Raffinose | 1.26 |
| Stachyose | 6.31 |
| Isoflavones | 1.06 |
| Daidzin | 0.26 |
| Glycitin | 0.02 |
| Genistin | 0.22 |
| 6"-O-malonyldaidzin | 0.16 |
| 6"-O-malonylglycitin | 0.02 |
| 6"-O-acetyl genistin | 0.02 |
| 6"-O-malonylgenistin | 0.23 |
| Daidzein | 0.05 |
| Genistein | 0.08 |
| Soyasapogenols | 3.72 |
| soyasapogenol A | 0.86 |
| soyasapogenol B | 2.86 |
| Nitrogen Solubility Index (NSI) (%) | 87.6 |
| Solubility Index (ml of sediment) | 7.5 |
| Viscosity (cP) | 236.4 |
| Chymotrypsin Inhibitor (CI) | 227.62 |

EXAMPLE 7

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 7.02. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The suspension was fed to an ultrafiltration membrane system containing two spiral-wound membranes, one each of 50,000 and 60,000 MWCO. The temperature of the suspension was maintained at about 48.9° C. (120° F.) during membrane processing. After removing about 189.3 L (50 gallons) of permeate, 189.3 L (50 gallons) of water was added to the membrane feed tank. This step of permeate removal and water addition (diafiltration) was repeated once again so that total volume of water added to membrane feed tank was 378.5 L (100 gallons). All the water added to membrane feed tank and about 75% of the original feed volume added to the membrane feed tank was removed as permeate so that the total volume of permeate removed was 662.4 L (175 gallons). The retentate from the membrane system was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 7. All results are on moisture-free basis, unless otherwise stated.

TABLE 7

Composition of product derived from the method of EXAMPLE 7

| Composition | mg/g of total dry matter |
|---|---|
| Protein (wt. %) | 91.50 |
| Crude Fiber (wt. %) | 0.64 |
| Crude Fat (wt. %) | 0.01 |
| Ash (wt. %) | 5.53 |
| Fructose | 0 |
| Glucose/Galactose | 0 |
| Sucrose | 0 |
| Raffinose | 2.44 |
| Stachyose | 11.03 |
| Isoflavones | 1.53 |
| Daidzin | 0.32 |
| Glycitin | 0.05 |
| Genistin | 0.46 |
| 6"-O-malonyldaidzin | 0.21 |
| 6"-O-malonylglycitin | 0.03 |
| 6"-O-acetyl genistin | 0.02 |
| 6"-O-malonylgenistin | 0.30 |
| Daidzein | 0.06 |
| Genistein | 0.08 |
| Soyasapogenols | 3.50 |
| soyasapogenol A | 0.90 |
| soyasapogenol B | 2.60 |
| Nitrogen Solubility Index (NSI) (%) | 87.3 |
| Solubility Index (ml of sediment) | 4.0 |
| Viscosity (cP) | 201.6 |
| Chymotrypsin Inhibitor (CI) | 232.1 |

EXAMPLE 8

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 7.10. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The suspension was fed to an ultrafiltration membrane system containing two spiral-wound membranes, one each of 50,000 and 60,000 MWCO. The temperature of the suspension was maintained at about 26.7° C. (80° F.) during membrane processing. After removing about 189.3 L (50 gallons) of permeate, 189.3 L (50 gallons) of water was added to the membrane feed tank. This step of permeate removal and water addition (diafiltration) was repeated twice again so that total volume of water added to membrane feed tank was 567.8 L (150 gallons). All the water added to membrane feed tank and about 75% of the original feed volume added to the membrane feed tank was removed as permeate so that the total volume of permeate removed was 851.7 L (225 gallons). The retentate from the membrane system was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 8. All results are on moisture-free basis, unless otherwise stated.

TABLE 8

Composition of product derived from the method of EXAMPLE 8

| Composition | mg/g of total dry matter |
|---|---|
| Protein (wt. %) | 92.63 |
| Crude Fiber (wt. %) | 0.21 |
| Crude Fat (wt. %) | 0.01 |
| Ash (wt. %) | 5.30 |
| Fructose | 0 |
| Glucose/Galactose | 0 |
| Sucrose | 8.05 |
| Raffinose | 1.78 |
| Stachyose | 9.83 |
| Isoflavones | 1.55 |
| Daidzin | 0.24 |
| Glycitin | 0.04 |
| Genistin | 0.39 |
| 6"-O-malonyldaidzin | 0.23 |
| 6"-O-malonylglycitin | 0.03 |
| 6"-O-acetyl genistin | 0.03 |
| 6"-O-malonylgenistin | 0.42 |
| Daidzein | 0.07 |
| Genistein | 0.10 |
| Soyasapogenols | 4.22 |
| soyasapogenol A | 1.13 |
| soyasapogenol B | 3.09 |
| Nitrogen Solubility Index (NSI) (%) | 89.9 |
| Solubility Index (ml of sediment) | 4.0 |
| Viscosity (cP) | 106.6 |
| Chymotrypsin Inhibitor (CI) | 222.2 | dryer. The dried product was analyzed to determine the content thereof. The results of the analysis are shown in TABLE 9. All results are on moisture-free basis, unless otherwise stated.

TABLE 9

Composition of product derived from the method of EXAMPLE 9

| Composition | mg/g of total dry matter |
|---|---|
| Protein (wt. %) | 93.04 |
| Crude Fiber (wt. %) | 1.47 |
| Crude Fat (wt. %) | 0.13 |
| Ash (wt. %) | 5.33 |
| Fructose | 0 |
| Glucose/Galactose | 0 |
| Sucrose | 5.27 |
| Raffinose | 1.37 |
| Stachyose | 7.48 |
| Isoflavones | 0.87 |
| Daidzin | 0.23 |
| Glycitin | 0.03 |
| Genistin | 0.26 |
| 6"-O-malonyldaidzin | 0.11 |
| 6"-O-malonylglycitin | 0.01 |
| 6"-O-acetyl genistin | 0.01 |
| 6"-O-malonylgenistin | 0.14 |
| Daidzein | 0.03 |
| Genistein | 0.05 |
| Soyasapogenols | 3.41 |
| soyasapogenol A | 0.72 |
| soyasapogenol B | 2.69 |
| Nitrogen Solubility Index (NSI) (%) | 91.4 |
| Solubility Index (ml of sediment) | 6.0 |
| Viscosity (cP) | 193.4 |
| Chymotrypsin Inhibitor (CI) | 212.9 |

EXAMPLE 9

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 7.23. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The suspension was fed to an ultrafiltration membrane system containing two spiral-wound membranes, one each of 50,000 and 60,000 MWCO. The temperature of the suspension was maintained at about 60.0° C. (140° F.) during membrane processing. After removing about 189.3 L (50 gallons) of permeate, 189.3 L (50 gallons) of water was added to the membrane feed tank. This step of permeate removal and water addition (diafiltration) was repeated twice again so that total volume of water added to membrane feed tank was 567.8 L (150 gallons). All the water added to membrane feed tank and about 75% of the original feed volume added to the membrane feed tank was removed as permeate so that the total volume of permeate removed was 851.7 L (225 gallons). The retentate from the membrane system was pasteurized at about 82.2° C. (180° F.) and spray dried using a high-pressure pump feeding a spray nozzle in a vertical spray

EXAMPLE 10

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 7.13. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The pH of the suspension was adjusted to 6.75 using hydrochloric acid. The suspension was fed to an ultrafiltration membrane system containing two spiral-wound membranes, both of 5,000 MWCO. The temperature of the suspension was maintained at about 48.9° C. (120° F.) during membrane processing. After removing about 189.3 L (50 gallons) of permeate, 189.3 L (50 gallons) of water was added to the membrane feed tank. This step of permeate removal and water addition (diafiltration) was repeated twice again so that total volume of water added to membrane feed tank was 567.8 L (150 gallons). All the water added to membrane feed tank and about 75% of the original feed volume added to the membrane feed tank was removed as permeate so that the total volume of permeate removed was 851.7 L (225 gallons). The retentate from the membrane system was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 10. All results are on moisture-free basis, unless otherwise stated.

TABLE 10

Composition of product derived from the method of EXAMPLE 10

| Composition | mg/g of total dry matter |
| --- | --- |
| Protein (wt. %) | 93.45 |
| Crude Fiber (wt. %) | 0.32 |
| Crude Fat (wt. %) | 0.01 |
| Ash (wt. %) | 5.14 |
| Fructose | 0 |
| Glucose/Galactose | 0 |
| Sucrose | 5.43 |
| Raffinose | 1.49 |
| Stachyose | 7.77 |
| Isoflavones | 0.85 |
| Daidzin | 0.15 |
| Glycitin | 0.02 |
| Genistin | 0.22 |
| 6"-O-malonyldaidzin | 0.12 |
| 6"-O-malonylglycitin | 0.01 |
| 6"-O-acetyl genistin | 0.02 |
| 6"-O-malonylgenistin | 0.19 |
| Daidzein | 0.05 |
| Genistein | 0.07 |
| Soyasapogenols | 3.48 |
| soyasapogenol A | 0.73 |
| soyasapogenol B | 2.75 |
| Nitrogen Solubility Index (NSI) (%) | 85.9 |
| Solubility Index (ml of sediment) | 7.5 |
| Viscosity (cP) | 208.0 |
| Chymotrypsin Inhibitor (CI) | 263.6 |

EXAMPLE 11

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 6.90. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The pH of the suspension was adjusted to 6.75 using hydrochloric acid. The suspension was fed to an ultrafiltration membrane system containing two spiral-wound membranes, both of 10,000 MWCO. The temperature of the suspension was maintained at about 48.9° C. (120° F.) during membrane processing. After removing about 189.3 L (50 gallons) of permeate, 189.3 L (50 gallons) of water was added to the membrane feed tank. This step of permeate removal and water addition (diafiltration) was repeated twice again so that total volume of water added to membrane feed tank was 567.8 L (150 gallons). All the water added to membrane feed tank and about 75% of the original feed volume added to the membrane feed tank was removed as permeate so that the total volume of permeate removed was 851.7 L (225 gallons). The retentate from the membrane system was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 11. All results are on moisture-free basis, unless otherwise stated.

TABLE 11

Composition of product derived from the method of EXAMPLE 11

| Composition | mg/g of total dry matter |
| --- | --- |
| Protein (wt. %) | 92.81 |
| Crude Fiber (wt. %) | 1.94 |
| Crude Fat (wt. %) | 0.03 |
| Ash (wt. %) | 4.83 |
| Fructose | 0 |
| Glucose/Galactose | 0 |
| Sucrose | 5.28 |
| Raffinose | 1.51 |
| Stachyose | 6.25 |
| Isoflavones | 1.07 |
| Daidzin | 0.16 |
| Glycitin | 0.02 |
| Genistin | 0.24 |
| 6"-O-malonyldaidzin | 0.17 |
| 6"-O-malonylglycitin | 0.02 |
| 6"-O-acetyl genistin | 0.03 |
| 6"-O-malonylgenistin | 0.28 |
| Daidzein | 0.06 |
| Genistein | 0.09 |
| Soyasapogenols | 3.95 |
| soyasapogenol A | 1.04 |
| soyasapogenol B | 2.91 |
| Nitrogen Solubility Index (NSI) (%) | 84.4 |
| Solubility Index (ml of sediment) | 6.0 |
| Viscosity (cP) | 142.4 |
| Chymotrypsin Inhibitor (CI) | 261.2 |

EXAMPLE 12

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 6.91. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The pH of the suspension was adjusted to 6.75 using citric acid. The suspension was fed to an ultrafiltration membrane system containing two spiral-wound membranes, both of 10,000 MWCO. The temperature of the suspension was maintained at about 48.9° C. (120° F.) during membrane processing. After removing about 189.3 L (50 gallons) of permeate, 189.3 L (50 gallons) of water was added to the membrane feed tank. This step of permeate removal and water addition (diafiltration) was repeated twice again so that total volume of water added to membrane feed tank was 567.8 L (150 gallons). All the water added to membrane feed tank and about 75% of the original feed volume added to the membrane feed tank was removed as permeate so that the total volume of permeate removed was 851.7 L (225 gallons).

The retentate from the membrane system was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 12. All results are on moisture-free basis, unless otherwise stated.

TABLE 12

Composition of product derived from the method of EXAMPLE 12

| Composition | mg/g of total dry matter |
| --- | --- |
| Protein (wt. %) | 91.73 |
| Crude Fiber (wt. %) | 0.94 |
| Crude Fat (wt. %) | 0.09 |
| Ash (wt. %) | 4.05 |
| Fructose | 0 |
| Glucose/Galactose | 0 |
| Sucrose | 5.86 |
| Raffinose | 1.26 |
| Stachyose | 7.12 |
| Isoflavones | 1.14 |
| Daidzin | 0.19 |
| Glycitin | 0.03 |
| Genistin | 0.29 |
| 6"-O-malonyldaidzin | 0.17 |
| 6"-O-malonylglycitin | 0.02 |
| 6"-O-acetyl genistin | 0.04 |
| 6"-O-malonylgenistin | 0.28 |
| Daidzein | 0.05 |
| Genistein | 0.07 |
| Soyasapogenols | 3.86 |
| soyasapogenol A | 0.96 |
| soyasapogenol B | 2.90 |
| Nitrogen Solubility Index (NSI) (%) | 87.6 |
| Solubility Index (ml of sediment) | 6.0 |
| Viscosity (cP) | 121.6 |
| Chymotrypsin Inhibitor (CI) | 240.21 |

EXAMPLE 13

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 6.97. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The pH of the suspension was adjusted to 6.75 using hydrochloric acid. The suspension was fed to an ultrafiltration membrane system containing two spiral-wound membranes, both of 10,000 MWCO. The temperature of the suspension was maintained at about 26.7° C. (80° F.) during membrane processing. After removing about 189.3 L (50 gallons) of permeate, 189.3 L (50 gallons) of water was added to the membrane feed tank. This step of permeate removal and water addition (diafiltration) was repeated twice again so that total volume of water added to membrane feed tank was 567.8 L (150 gallons). All the water added to membrane feed tank and about 75% of the original feed volume added to the membrane feed tank was removed as permeate so that the total volume of permeate removed was 851.7 L (225 gallons). The retentate from the membrane system was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 13. All results are on moisture-free basis, unless otherwise stated.

TABLE 13

Composition of product derived from the method of EXAMPLE 13

| Composition | mg/g of total dry matter |
| --- | --- |
| Protein (wt. %) | 92.08 |
| Crude Fiber (wt. %) | 1.58 |
| Crude Fat (wt. %) | 0.01 |
| Ash (wt. %) | 4.81 |
| Fructose | 0 |
| Glucose/Galactose | 0 |
| Sucrose | 6.63 |
| Raffinose | 1.90 |
| Stachyose | 7.90 |
| Isoflavones | 1.63 |
| Daidzin | 0.21 |
| Glycitin | 0.03 |
| Genistin | 0.38 |
| 6"-O-malonyldaidzin | 0.26 |
| 6"-O-malonylglycitin | 0.03 |
| 6"-O-acetyl genistin | 0.04 |
| 6"-O-malonylgenistin | 0.48 |
| Daidzein | 0.09 |
| Genistein | 0.11 |
| Soyasapogenols | 4.67 |
| soyasapogenol A | 1.06 |
| soyasapogenol B | 3.61 |
| Nitrogen Solubility Index (NSI) (%) | 87.0 |
| Solubility Index (ml of sediment) | 5.0 |
| Viscosity (cP) | 130.0 |
| Chymotrypsin Inhibitor (CI) | 238.4 |

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A soy protein isolate, comprising:
   a protein content of at least 90.0 wt. % of total dry matter wherein the protein is extracted from a starting material at a pH of between about 6.8 and about 10;
   an isoflavone content of at least 1.0 mg/g of total dry matter;
   a Nitrogen Solubility Index ("NSI") of at least 75%; and
   wherein the protein content, the isoflavone content and the Nitrogen Solubility Index ("NSI") are measured on a dried soy protein isolate and wherein a solution of about 12.0 wt. % of said dried soy protein isolate in water at a temperature of about 22° C. has a viscosity of less than 500 centipoises (cp).

2. The soy protein isolate of claim 1, further comprising an ash content of less than about 6.0 wt. % of total dry matter.

3. The soy protein isolate of claim 1, further comprising a soyasapogenols content of at least about 2.0 mg/g of total dry matter.

4. The soy protein isolate of claim 1, further comprising a crude fiber content of less than about 2.0 wt. % of total dry matter.

5. The soy protein isolate of claim 1, further comprising a Chymotrypsin Inhibitor ("CI") content of at least about 100 mg/g of total dry matter.

6. The soy protein isolate of claim 1, further comprising a solubility index of less than 10 ml sediment.

7. A liquid or dry beverage, food or nutritional product including the soy protein isolate of claim 1.

8. The liquid or dry beverage, food, or nutritional product of claim 7 wherein the liquid or dry beverage is selected from the group consisting of milk replacers, drink mixes, flavored beverages, and mixtures thereof.

9. The liquid or dry beverage, food, or nutritional product of claim 7 wherein the food or nutritional product is selected from the group consisting of dairy products, yogurt, protein bars, whole muscle meat injection, surimi products, emulsified meats, cereal products, bakery products, and mixtures thereof.

10. A method for producing a soy protein isolate, comprising the steps of:
   (a) providing a substantially defatted soybean material;
   (b) mixing the material with water and extracting proteins from the material at a pH of between about 6.8 and about 10.0;
   (c) removing insolubles to produce a liquor;
   (d) heat treating the liquor at a temperature above about 93° C.;
   (e) subjecting the liquor to ultrafiltration with diafiltration to obtain a retentate thereby producing a wet soy protein isolate; and
   (f) drying the retentate to obtain a dry soy protein isolate;
   wherein the soy protein isolate has a protein content of at least 90.0 wt. % of total dry matter, an isoflavone content of at least 1.0 mg/g of total dry matter, a Nitrogen Solubility Index ("NSI") of at least 75%, wherein the protein content, the isoflavone content and the Nitrogen Solubility Index ("NSI") are measured on a dried soy protein isolate and wherein a solution of about 12.0 wt. % of said dried soy protein isolate in water at a temperature of about 22° C. has a viscosity of less than 500 centipoises (cp).

11. The method of claim 10, wherein said heat treating step (d) is carried out prior to said removing step (c).

12. The method of claim 10, wherein the ultrafiltration of said step (e) is conducted at a temperature of between about 25° C. and about 60° C.

13. The method of claim 10, wherein the ultrafiltration of said step (e) is conducted using an ultrafiltration membrane having a molecular weight cut-off between about 5,000 and about 60,000.

14. The method of claim 10 wherein the mixture in said mixing step (b) contains from about 5.0 wt. % to about 15.0 wt. % solids.

15. The method of claim 10, wherein said heat treating step (d) comprises a jet cooking process.

16. The method of claim 10, wherein said soy protein isolate comprises a soyasapogenols content of at least about 2.0 mg/g of total dry matter.

17. The method of claim 10, wherein said soy protein isolate comprises a crude fiber content of less than about 2.0 wt. % of total dry matter.

18. The method of claim 10, wherein said soy protein isolate comprises a Chymotrypsin Inhibitor ("CI") content of at least about 100 mg/g of total dry matter.

19. The method of claim 10, wherein said soy protein isolate comprises a solubility index of less than 10 ml sediment.

20. A soy protein isolate prepared by the method of claim 10.

21. A liquid or dry beverage, food or nutritional product including the soy protein isolate of claim 20.

* * * * *